(12) United States Patent
Yamatani

(10) Patent No.: US 8,928,931 B2
(45) Date of Patent: Jan. 6, 2015

(54) IMAGE FORMING APPARATUS

(75) Inventor: Mitsuru Yamatani, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/570,756

(22) Filed: Aug. 9, 2012

(65) Prior Publication Data

US 2013/0050715 A1 Feb. 28, 2013

(30) Foreign Application Priority Data

Aug. 30, 2011 (JP) ................................ 2011-187544

(51) Int. Cl.
*G06K 15/02* (2006.01)
*H04N 1/32* (2006.01)
*G03G 15/00* (2006.01)

(52) U.S. Cl.
CPC ....... *H04N 1/32133* (2013.01); *G03G 15/5062* (2013.01); *H04N 2201/3242* (2013.01); *H04N 2201/3269* (2013.01); *H04N 2201/0091* (2013.01)
USPC ............. 358/1.2; 382/240; 382/264; 358/1.6; 358/1.15; 358/448; 358/501

(58) Field of Classification Search
None
See application file for complete search history.

(56) References Cited

U.S. PATENT DOCUMENTS

| | | | | |
|---|---|---|---|---|
| 4,903,310 A * | 2/1990 | Takeo et al. | .................... | 382/132 |
| 5,235,655 A * | 8/1993 | Hikawa | ........................... | 382/317 |
| 5,832,136 A * | 11/1998 | Hirose | ........................... | 382/275 |
| 5,838,833 A * | 11/1998 | Ishikawa et al. | ............... | 382/249 |
| 5,949,554 A * | 9/1999 | Melen | ........................... | 358/448 |
| 6,026,197 A * | 2/2000 | Ohsawa et al. | ............... | 382/240 |
| 6,101,018 A * | 8/2000 | Naiki et al. | ................. | 359/204.1 |
| 6,424,742 B2 | 7/2002 | Yamamoto et al. | | |
| 6,674,551 B1 * | 1/2004 | Takura | ........................... | 358/451 |
| 6,807,316 B2 * | 10/2004 | Enomoto | ...................... | 382/264 |
| 8,208,820 B2 * | 6/2012 | Togami | ........................... | 399/27 |
| 8,477,393 B2 * | 7/2013 | Nagahara et al. | ............. | 358/501 |
| 2002/0006230 A1 | 1/2002 | Enomoto | | |
| 2004/0046974 A1 * | 3/2004 | Takura | ........................... | 358/1.2 |
| 2009/0073508 A1 | 3/2009 | Sadowara | | |

FOREIGN PATENT DOCUMENTS

| | | |
|---|---|---|
| CN | 1213118 A | 4/1999 |
| CN | 101266440 A | 9/2008 |
| CN | 101388946 A | 3/2009 |
| JP | 08-044178 A | 2/1996 |

OTHER PUBLICATIONS

Notification of First Office Action in Chinese Patent Application No. 201210316682.8 dated Aug. 28, 2014, State Intellectual Property Office of the Peoples Republic of China.

* cited by examiner

*Primary Examiner* — Ashish K Thomas
(74) *Attorney, Agent, or Firm* — Fitzpatrick, Cella, Harper & Scinto

(57) ABSTRACT

An image forming apparatus, including: a reading portion configured to read an original to generate original image data; a code detecting portion configured to detect a code indicating image density reduction information from the original image data; a reconstruction processing portion configured to generate output image data from the original image data by using density input-output characteristics corresponding to the image density reduction information; a filter portion configured to perform unsharpness processing on the output image data by using a degree corresponding to the image density reduction information; and an image forming portion configured to form an image based on the output image data subjected to the unsharpness processing.

10 Claims, 10 Drawing Sheets

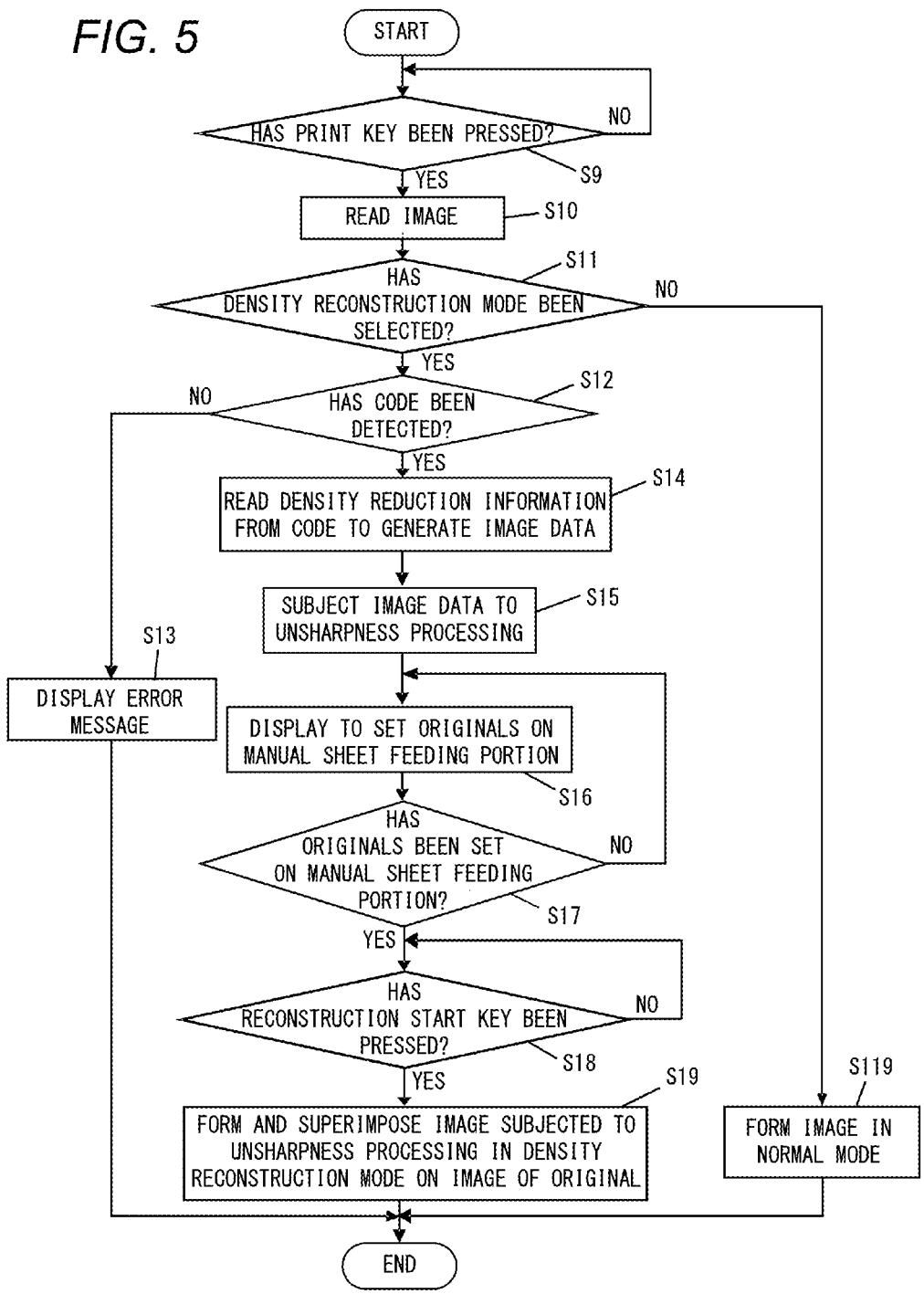

IMAGE FORMING APPARATUS

BACKGROUND OF THE INVENTION

1. Field of the Invention

The present invention relates to an image forming apparatus including a reconstruction processing portion.

2. Description of the Related Art

There is need for image forming apparatuses employing a toner system to reduce toner consumption in image formation in order to realize low running cost. To that end, Japanese Patent Application Laid-Open No. H08-044178 discloses a method of using a low toner consumption mode in the image forming apparatus of an electrophotographic system. By using the low toner consumption mode disclosed in Japanese Patent Application Laid-Open No. H08-044178, it is possible to realize a reduction in the toner consumption in the image formation.

An image formed in the low toner consumption mode has a low density. When a recording medium on which the image having a normal density is formed is desired, if there is no image data having a normal density, it is conceivable to temporarily read the image formed in the low toner consumption mode from an original to generate image data and to increase a density of the generated image data to form an image on a recording medium with a higher density. However, with this method, a user does not know to which extent to increase the density of the generated image data, and hence it is normally difficult to output an image with a desired normal density with one processing. In that case, it is necessary to repeatedly output an image.

Further, in a case where the image is read by a scanner from the original and the read image data is output to a new recording medium at the density adjusted, the image quality deteriorates in general. In the first place, an S/N ratio of the image data generated by reading the original by the scanner deteriorates compared to an S/N ratio of the image on the original. In this case, representative noise includes a micro-level uneven density caused by uneven transferability due to low smoothness of paper of the original. In addition, when the density of the image is increased, the uneven density also becomes high, with the result that the uneven density becomes more conspicuous.

Here, the uneven density of the image ascribable to the smoothness of the paper can be indicated by an uneven density index. In this case, the uneven density index is defined by scanning by the scanner a paper sheet on which a blue image is formed and obtaining a standard deviation of the square of a reflection density with respect to a basis weight. Assuming that the reflection density is Dr and the basis weight ($g/m^2$) is B, an uneven density index M is a function of (standard deviation of $Dr^2$)/B. Further, as described later, the uneven density index M also changes based on a texture index. It is assumed that the density and the uneven density index of the image of the original are $d_0$ and $M_0$, respectively, and the density and the uneven density index of the image formed on a new recording medium are $d_1$ and $M_c$, respectively. The uneven density index $M_c$ of the image formed on the recording medium is expressed as $M_c = M_0 \times a_0$ by using density ratio $a_0$ ($a_0 = d_1/d_0$) of the density $d_1$ of the image on the recording medium with respect to the density $d_0$ of the image of the original. In other words, when the density is increased $a_0$-fold, the uneven density index is increased $a_0$-fold as well. FIG. 12 shows the uneven density index $M_c$ with respect to the density ratio $a_0$. As shown in FIG. 12, as the density ratio $a_0$ increases, the uneven density index $M_c$ increases.

As described above, it is difficult to form the image having a desired density on the recording medium with one processing by using the image data generated by reading the image from the original on which the image is formed in the low toner consumption mode. Further, the uneven density increases when the density of the image data is increased.

SUMMARY OF THE INVENTION

Therefore, an exemplary embodiment of the present invention provides an image forming apparatus which forms a reconstructed image while suppressing an increase in uneven density.

According to the exemplary embodiment of the present invention, there is provided an image forming apparatus, including: a reading portion configured to read an original to generate original image data; a code detecting portion configured to detect a code indicating image density reduction information from the original image data; a reconstruction processing portion configured to generate output image data from the original image data by using density input-output characteristics corresponding to the image density reduction information; a filter portion configured to perform unsharpness processing on the output image data by using a degree corresponding to the image density reduction information; and an image forming portion configured to form an image based on the output image data subjected to the unsharpness processing.

According to the exemplary embodiment of the present invention, by using the degree corresponding to the image density reduction information detected from the original image data to form the image based on the output image data subjected to the unsharpness processing, it is possible to form a reconstructed image while suppressing an increase in uneven density.

Further features of the present invention will become apparent from the following description of exemplary embodiments with reference to the attached drawings.

BRIEF DESCRIPTION OF THE DRAWINGS

FIG. 5 is a flowchart illustrating the image forming processing performed in a density reconstruction mode by the image forming apparatus according to the first embodiment.

DESCRIPTION OF THE EMBODIMENTS

Preferred embodiments of the present invention will now be described in detail in accordance with the accompanying drawings. It should be noted that the embodiments described below are examples of the best embodiments of the present invention, but the present invention is not limited to the embodiments described below.

Figure 1:
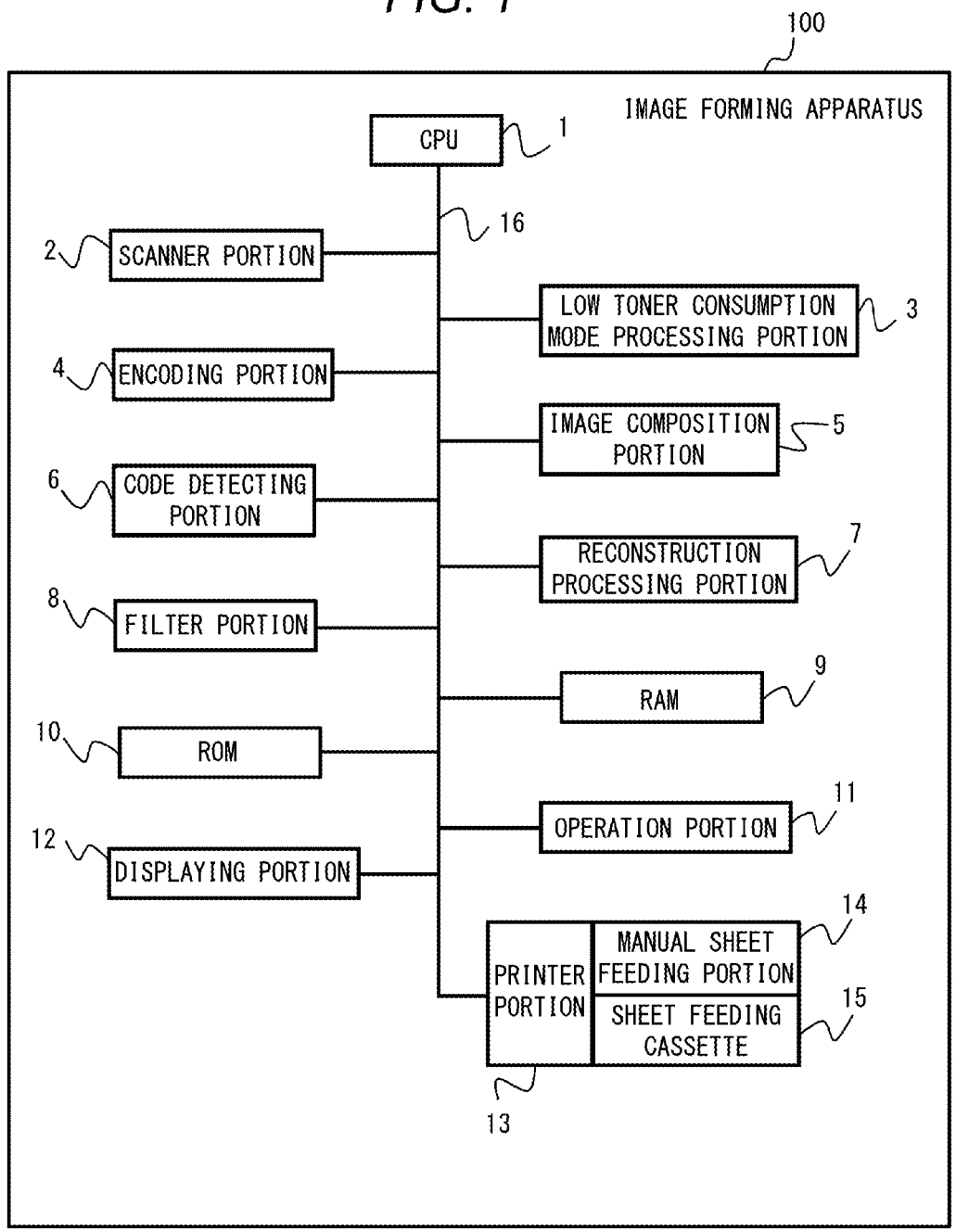
FIG. 1 is a block diagram illustrating a configuration of an image forming apparatus according to a first embodiment.

FIG. 1 is a block diagram illustrating a configuration of an image forming apparatus 100 according to a first embodiment.

A CPU 1 controls an operation of the image forming apparatus 100 based on a program stored in a ROM 10 and a mode instruction received from an operation portion 11 through which a user performs an input operation. The CPU 1 is connected to a bus 16. Also connected to the bus 16 are a scanner portion 2 being a reading portion (reading means), a low toner consumption mode processing portion 3 being low toner consumption mode processing means, an encoding portion 4 being encoding means, an image composition portion 5 being image composition means, and a code detecting portion 6 being code detecting means. Further connected to the bus 16 are a reconstruction processing portion 7 being reconstruction processing means, a filter portion 8 being filtering means, a RAM 9, a ROM 10 being a storage portion (storage means), the operation portion 11 being an adjusting portion (adjusting means), a displaying portion 12 being display means, and a printer portion 13 being an image forming portion (image forming means). The printer portion 13 includes a manual sheet feeding portion 14 and a sheet feeding cassette 15 as a sheet feeding portion (sheet feeding means).

Figure 2:
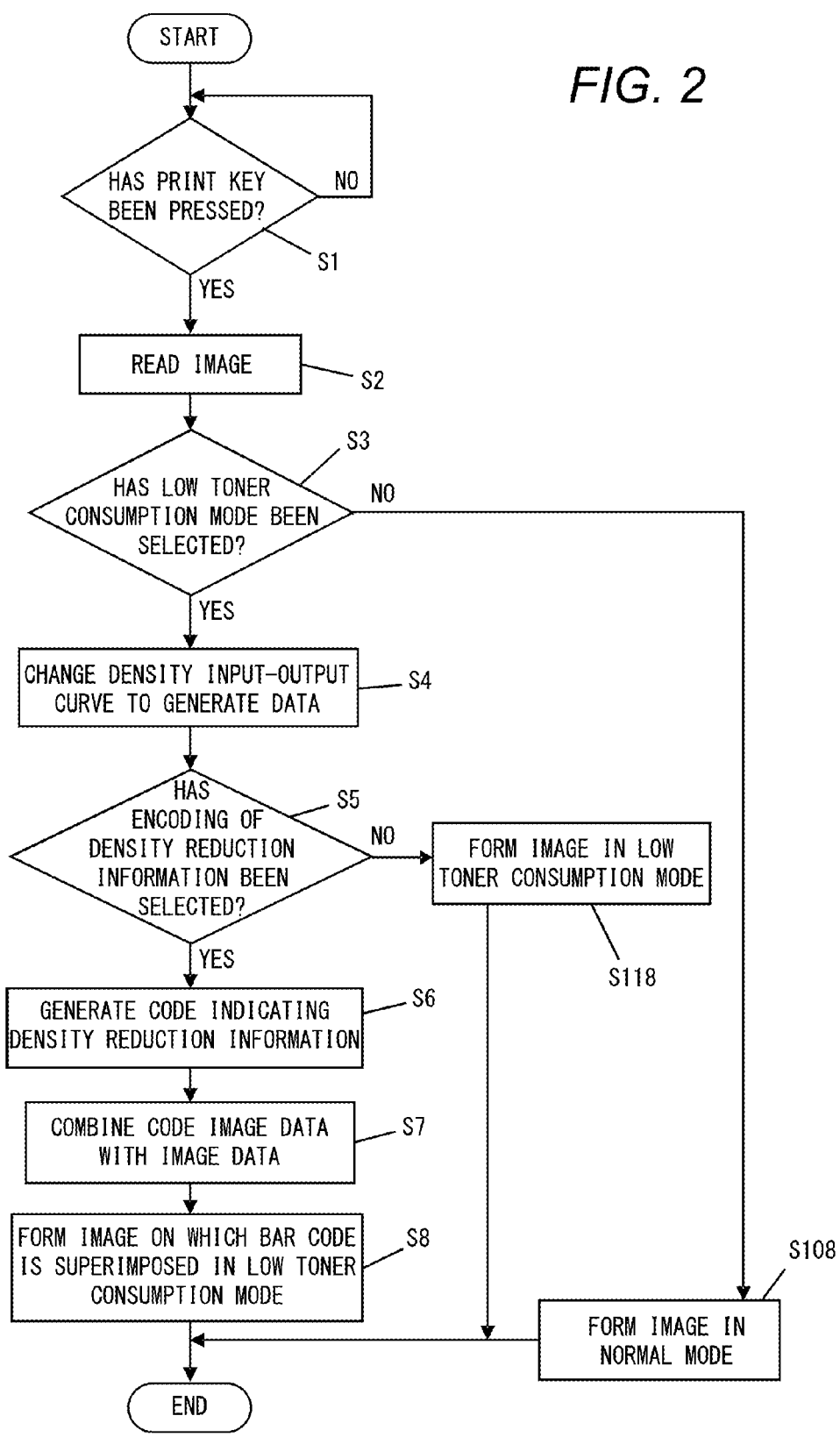
FIG. 2 is a flowchart illustrating image forming processing performed in a low toner consumption mode by the image forming apparatus according to the first embodiment.

FIG. 2 is a flowchart illustrating image forming processing performed in a low toner consumption mode by the image forming apparatus 100 according to the first embodiment. A program for performing the image forming processing in the low toner consumption mode is stored in the ROM 10 (storage medium). The CPU 1 reads the program stored in the ROM 10 to execute the image forming processing in the low toner consumption mode according to the program.

First, the CPU 1 determines whether or not a print key on the operation portion 11 has been pressed by the user (S1). When it is determined that the print key has been pressed (YES in S1), the scanner portion 2 reads an image 117 of an original Q1 (FIG. 4A) (S2). When it is determined that the print key has not been pressed (NO in S1), the procedure returns to Step S1.

After the image 117 is read, the CPU 1 determines whether or not the low toner consumption mode has been selected by the user through the operation portion 11 (S3). When the low toner consumption mode is not selected (NO in S3), in other words, when a normal mode is selected, the CPU 1 causes the printer portion 13 to perform image formation on a recording medium in the normal mode (S108). The phase "the image formation in the normal mode" as used herein means that a part of the read image 117 having a density of 100% is subjected to the image formation at the density of 100%, in other words, an image density input-output curve CA of FIG. 3A is obtained in this case.

When the low toner consumption mode is selected (YES in S3), the process proceeds to Step S4. In Step S4, the low toner consumption mode processing portion 3 changes the image density input-output curve from an input-output curve in the normal mode to an input-output curve in the low toner consumption mode to generate image data (low toner output image data) (S4).

Figure 3A:
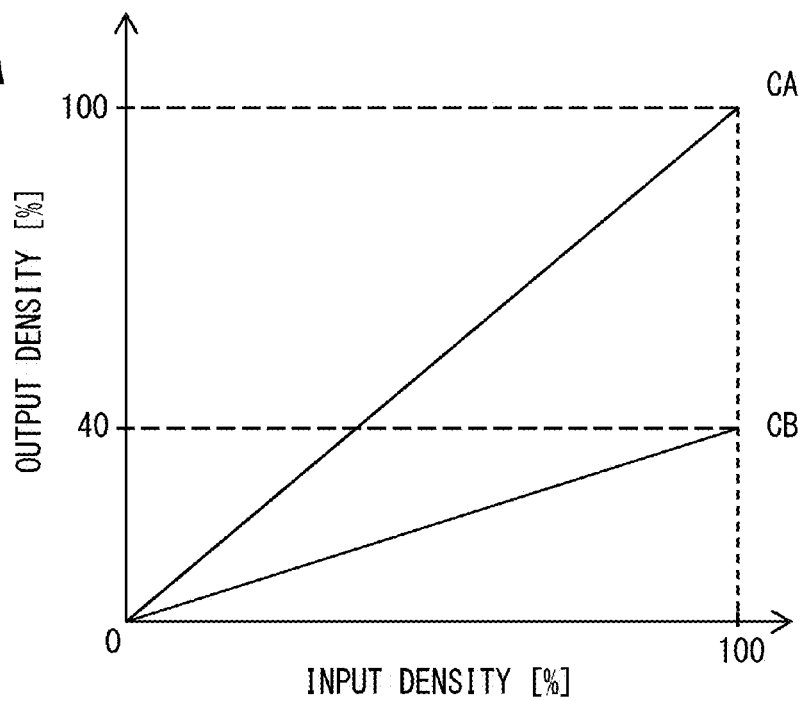
FIGS. 3A and 3B are graphs each showing image density input-output curves used by the image forming apparatus.

FIG. 3A shows the image density input-output curve CA in the normal mode and an image density input-output curve CB in the low toner consumption mode according to the first embodiment. In the normal mode, as described above, for the part of the read image having the density of 100%, the image data is generated at the density of 100%. However, in the low toner consumption mode according to the embodiment, for the part of the read image having the density of 100% being a third density, the image data (low toner output image data) is generated at the density of 40% being a first density. Note that, 40% is employed in the embodiment, to which the present invention is not limited.

After the input-output curve of the image density is changed to generate the image data, the CPU 1 determines whether or not encoding, as a bar code, of information (image density reduction information) indicating that the image density has been reduced has been selected by the user through the operation portion 11 (S5). The bar code is used in a density reconstruction mode which is described later in detail. Note that, a code indicating the image density reduction information is not limited to the bar code, and may be another code such as a QR code. When the encoding is not selected (NO in S5), the CPU 1 causes the printer portion 13 to perform the image formation on the recording medium in the low toner consumption mode (S118).

When the encoding of the image density reduction information is selected (YES in S5), the bar code indicating the image density reduction information is generated by the encoding portion 4 (S6). Bar code image data corresponding to the respective density reduction degrees is stored in the ROM 10. To generate the bar code, the corresponding bar code image data is read from the ROM 10.

The image composition portion 5 combines the bar code image data with the image data (low toner output image data) (S7). Based on the image data combined by the image composition portion 5, the printer portion 13 forms an image, which is obtained by superimposing a bar code image 18 on an image 17, on a recording medium P1 (FIG. 4B) in the low toner consumption mode (S8). Note that, the recording medium P1 subjected to the image formation is used as an original Q2 in the density reconstruction mode which is described later.

Figure 4A:
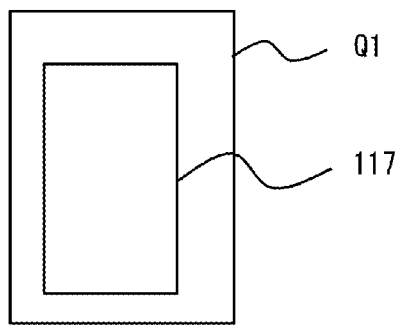
FIGS. 4A, 4B, 4C, 4D, and 4E are diagrams each illustrating an original and a recording medium.
Figure 4B:
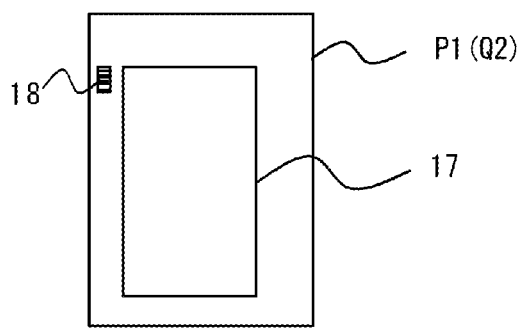

FIG. 4A illustrates the original Q1 on which the image 117 is formed. FIG. 4B illustrates the recording medium P1 on which the image 17 in the low toner consumption mode, which corresponds to the image 117 of the original Q1, and the bar code image 18 are formed. Examples of the recording medium P1 include paper, an OHP sheet, and cloth.

Note that, the selection involved in Steps S3 and S5 is performed based on a mode selected in advance by the user through the operation portion 11 before the print key is pressed. As another method, after the print key is pressed, in each case, the displaying portion 12 may prompt the user to make a selection through the operation portion 11, after the processing of Step S2 for the selection involved in Step S3.

Further, in the image formation, the recording medium P1 is fed from the manual sheet feeding portion 14 or the sheet feeding cassette 15.

Next, the density reconstruction mode for reconstructing the density of the image formed in the low toner consumption mode will be described.

FIG. 5 is a flowchart illustrating the image forming processing performed in the density reconstruction mode by the image forming apparatus 100 according to the first embodiment. A program for performing the image forming processing in the density reconstruction mode is stored in the ROM (storage medium) 10. The CPU 1 reads the program stored in the ROM 10 to execute the image forming processing in the density reconstruction mode according to the program.

In the density reconstruction mode according to the embodiment, as described later in detail, the recording medium P1 subject to the image formation in the low toner consumption mode is used as the original Q2, and the image data generated in the density reconstruction mode is superimposed on the image of the original Q2.

First, the CPU 1 determines whether or not the print key on the operation portion 11 has been pressed by the user (S9). When it is determined that the print key has been pressed (YES in S9), the scanner portion 2 scans the original Q2, reads the image, and outputs the image data on the original Q2 (S10). When it is determined that the print key has not been pressed (NO in S9), the process returns to Step S9. In this case, the original Q2 is the recording medium (S118) on which the image is formed in the low toner consumption mode or the recording medium P1 having formed thereon the image 17 on which the bar code image 18 is superimposed in the low toner consumption mode (S8).

Figure 3B:
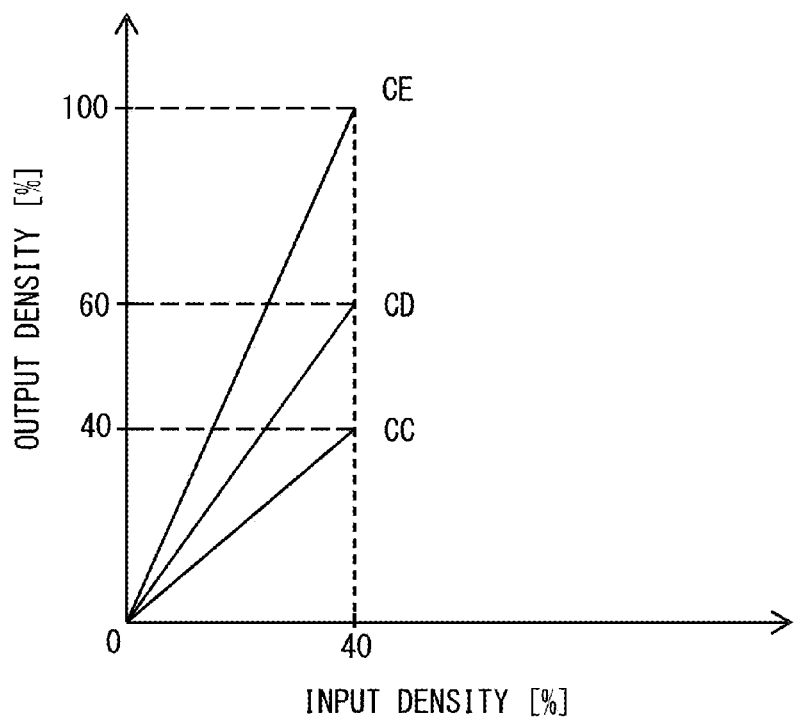
Figure 4C:
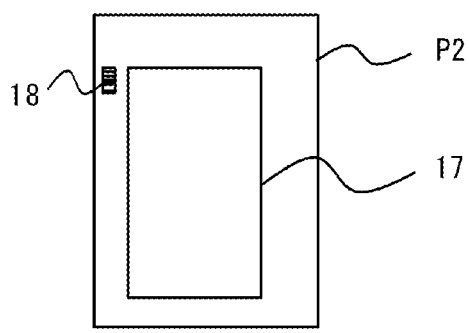

After the image is read, the CPU 1 determines whether or not the user has selected the density reconstruction mode through the operation portion 11 (S11). When the density reconstruction mode is not selected, in other words, when the normal mode is selected (NO in S11), the printer portion 13 forms the image on a recording medium P2 (FIG. 4C) in the normal mode (S119). FIG. 4C illustrates the recording medium P2 on which the image is formed in the normal mode. In this case, a part of the read image having the density of 40% is subjected to the image formation at the density of 40%. The original Q2 is an image formed in the low toner consumption mode, and therefore has a maximum density of 40%. In other words, the image density input-output curve (image density input-output characteristics) CC of FIG. 3B is obtained. Examples of the recording medium P2 include paper, an OHP sheet, cloth, and other such recording medium newly fed from the manual sheet feeding portion 14 or the sheet feeding cassette 15.

When the density reconstruction mode is selected (YES in S11), the CPU 1 determines whether or not the code detecting portion 6 has detected, from the image data on the original Q2, the bar code image 18 indicating the image density reduction information (S12). When the bar code image 18 is not detected (NO in S12), the displaying portion 12 displays an error message such as "The density reconstruction mode is disabled for the image without a bar code." (S13), and the process is brought to an end.

When the bar code image 18 is detected (YES in S12), the reconstruction processing portion 7 reads the image density reduction information from the bar code image 18. Then, the image density input-output curve corresponding to an amount by which the density is reduced is used to generate output image data from the image data on the original Q2 (S14). In the first embodiment, in the case where the image is formed in the low toner consumption mode, the part having the density of 100% is subjected to the image formation at the density of 40%, and hence the amount by which the density is reduced being a second density according to the embodiment is 60%. In other words, an image density input-output curve CD of FIG. 3B is used in Step S14.

Subsequently, the filter portion 8 subjects the generated image data to unsharpness processing to a degree corresponding to the image density input-output curve used in Step S14 (S15). In this case, the unsharpness processing represents processing for alleviating changes in density each pixel by performing averaging processing on density levels of a target pixel and adjacent pixels located before and after the target pixel in a main scanning direction and a sub-scanning direction.

Figure 6A:
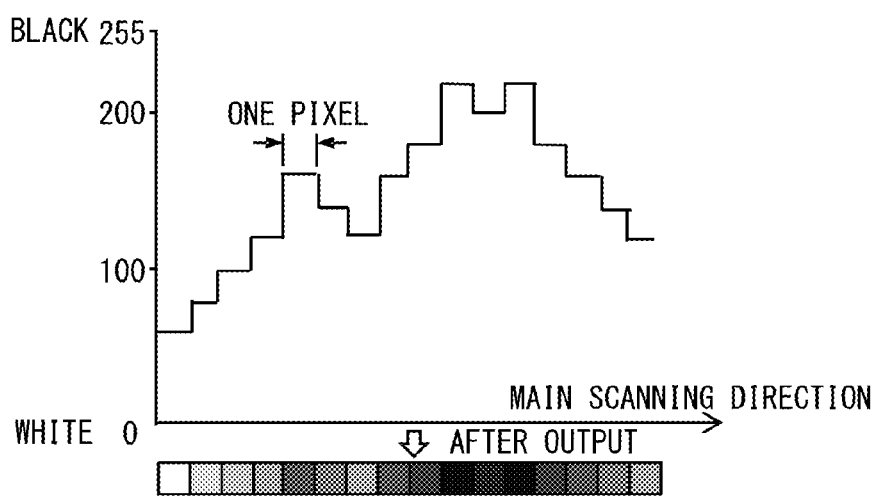
FIGS. 6A, 6B, and 6C are graphs showing an example of changes in image density caused by unsharpness processing.
Figure 6B:
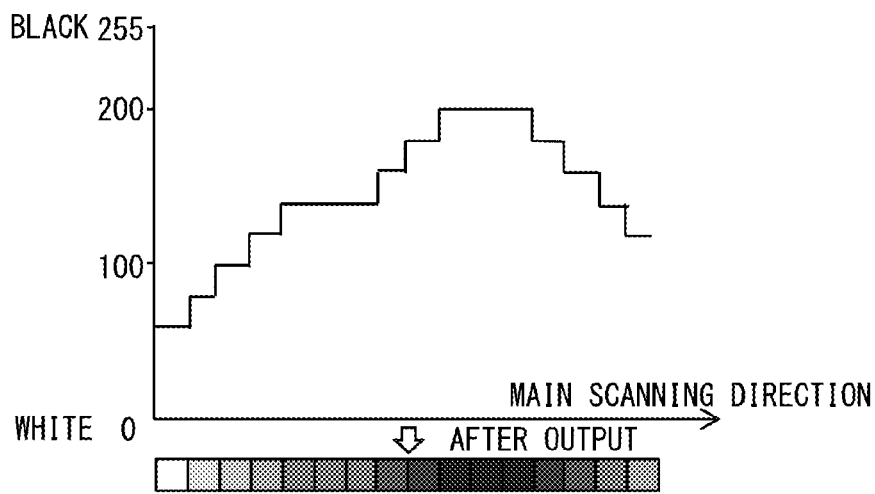
Figure 6C:
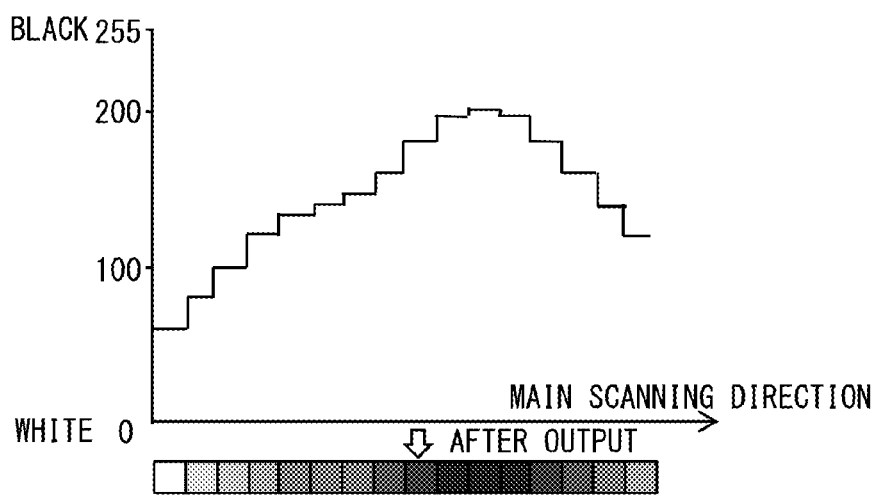

FIGS. 6A, 6B, and 6C show an example of the changes in the image density caused by the unsharpness processing. For example, when the unsharpness processing is executed on the image data having a distribution of the image densities in the main scanning direction as shown in FIG. 6A, image data having the uneven density smoothed as shown in FIG. 6B, in other words, image data having the density levels averaged is obtained. Further, when the degree of the unsharpness processing is increased, the image data having the uneven density further smoothed as shown in FIG. 6C is obtained.

Figure 7A:
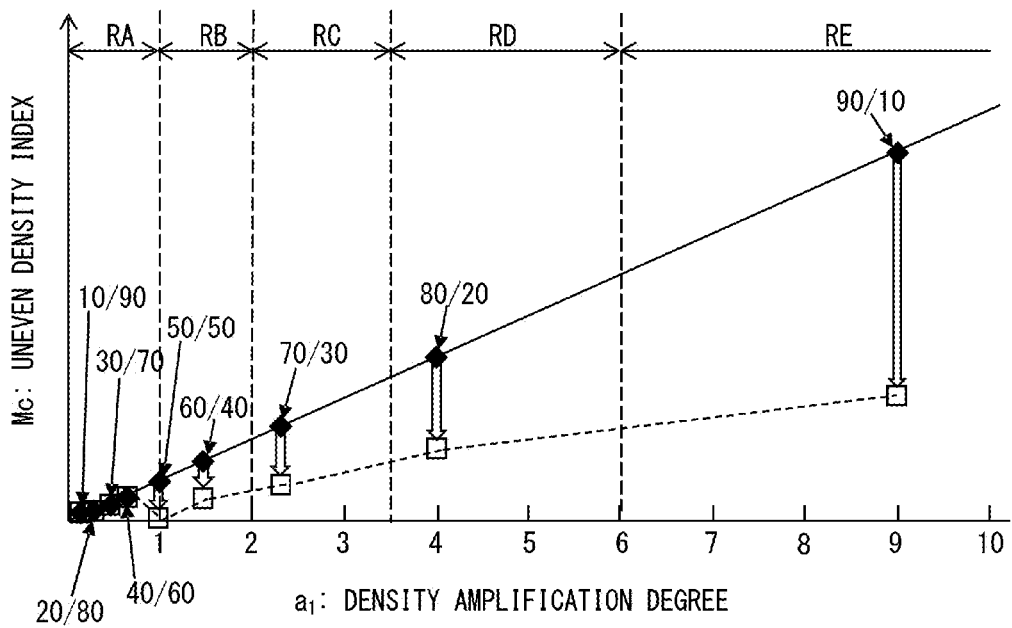
FIGS. 7A and 7B are graphs each showing an uneven density index with respect to a density amplification degree of image data used in image formation performed in the density reconstruction mode by the image forming apparatus.
Figure 7B:
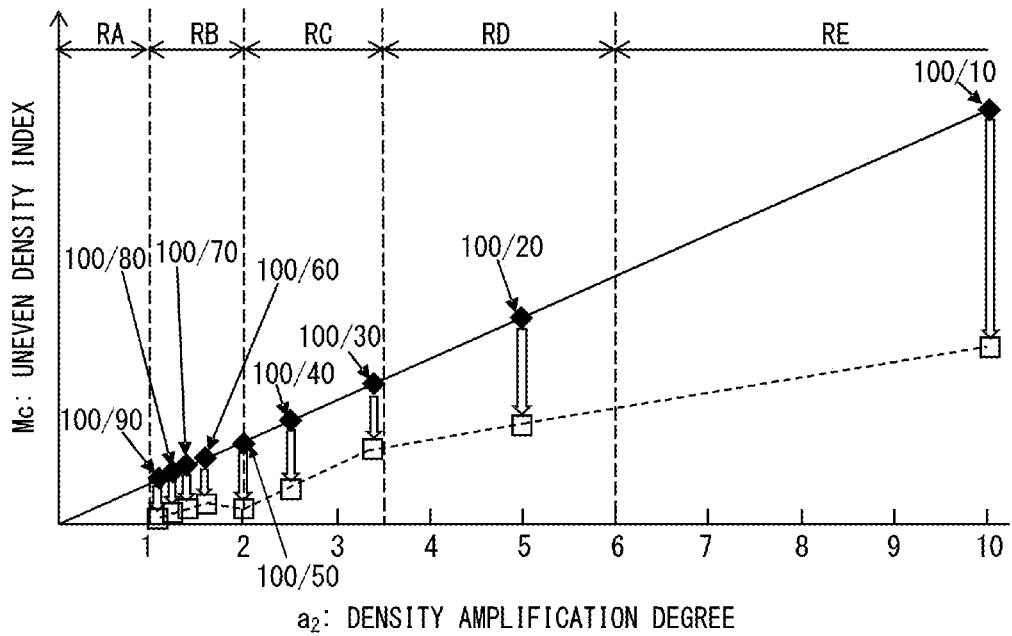

FIGS. 7A and 7B each show an uneven density index $M_c$ with respect to a density amplification degree of the image data used in the image formation performed in the density reconstruction mode by the image forming apparatus 100.

FIG. 7A shows the uneven density index $M_c$ with respect to a density amplification degree $a_1$ of the output image data generated by using the image density input-output curve corresponding to the amount by which the density is reduced in the first embodiment. In this case, assuming that the density of the image formed in the low toner consumption mode is $d_2$, the density amplification degree $a_1$ is defined by a ratio of the amount by which the density is reduced to $d_2$, in other words, $(100-d_2)/d_2$. In other words, for example, the density amplification degree $a_1$=60/40 means that the part of the original image having the density of 100% is subjected to the image formation at the density of 40% in the low toner consumption mode accordingly and the image data is generated in the density reconstruction mode at the density of 60%, which is the amount by which the density is reduced.

For example, in a case where density reduction information read from the code in Step S14 indicates the image density input-output curve CB, in other words, in a case where the image data is generated by using the image density input-output curve CD in Step S14, the density amplification degree $a_1$ is 60/40.

Figure 12:
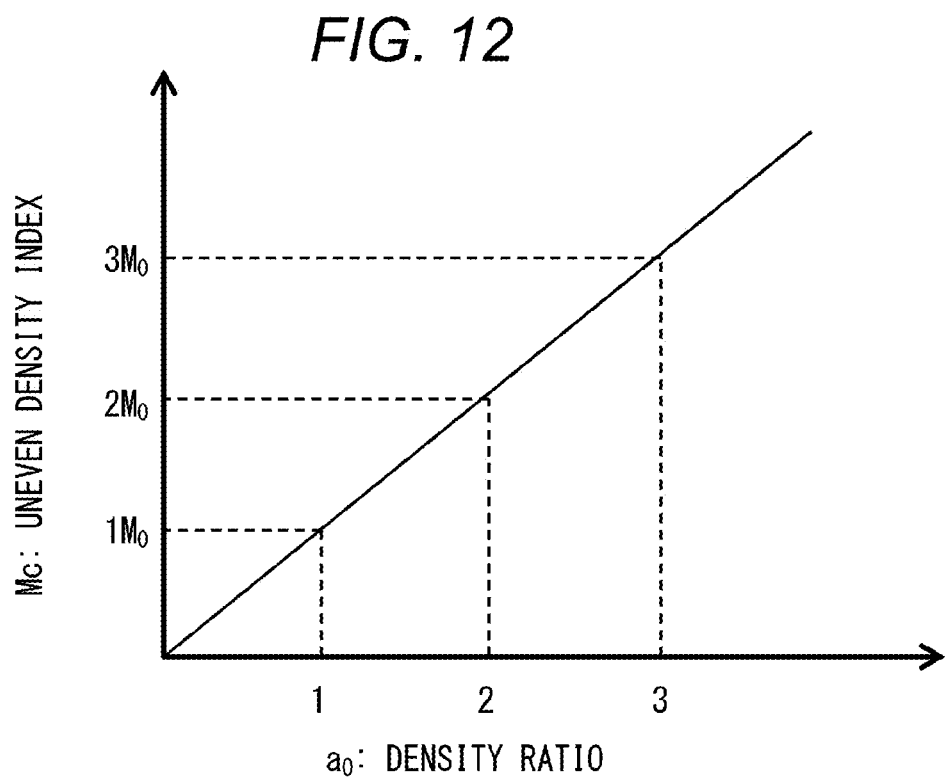
FIG. 12 is a graph showing the uneven density index with respect to a density ratio.

In FIG. 7A, the solid line indicates the uneven density indices $M_c$ (black diamonds) with respect to the representative density amplification degrees $a_1$ (10/90, 20/80, 30/70, 40/60, 50/50, 60/40, 70/30, 80/20, and 90/10) in the case where the unsharpness processing is not performed. In FIG. 7A, the solid line corresponds to a relationship of the uneven density index $M_c$ with respect to the density ratio $a_0$ ($M_c$=$M_0$× $a_0$) as shown in FIG. 12.

FIGS. 7A and 7B show ranges RA to RE which are segmented by the respective degrees used in the unsharpness processing, and more specifically, are segmented by the number N (predetermined number) of adjacent pixels used in the averaging processing performed on the density levels of the target pixel and the adjacent pixels located before and after the target pixel.

The range RA corresponds to a range of the density amplification degree $a_1$ being equal to or larger than 0 and less than 1. The range RA includes, for example, the density amplification degrees $a_1$ of 10/90, 20/80, 30/70, and 40/60. In the image data within the range RA, the amount by which the density is reduced is less than 50%, and hence the image data generated with the image density input-output curve corresponding to the amount by which the density is reduced exhibits small image quality deterioration. Further, in a case where an image is superimposed on the image of the original Q2 to form a density reconstructed image, a proportion of the image of the original Q2 to the density reconstructed image is large as well, and hence it is determined in the embodiment that there is no need to perform the unsharpness processing. Accordingly, the number N of adjacent pixels within the range RA is 0, and the averaging processing, in other words, the unsharpness processing is not performed.

On the other hand, as the density amplification degree $a_1$ becomes equal to or larger than 1, in other words, as the amount by which the density is reduced becomes equal to or larger than 50%, the image quality deterioration becomes larger. Further, in the case where an image is superimposed on the image of the original Q2 to form the density reconstructed image, the proportion of the image of the original Q2 to the density reconstructed image is small as well, and hence the degree to which the unsharpness processing is performed is increased when the density amplification degree $a_1$ is equal to or larger than 1.

In the embodiment, within the range RB ($a_1$ is equal to or larger than 1 and less than 2), N is set to 2, in other words, the averaging processing is performed in the main scanning direction and the sub-scanning direction respectively on the density levels of the target pixel and two pixels located before the target pixel and two pixels located after the target pixel. In the same manner, N within the range RC ($a_1$ is equal to or larger than 2 and less than 3.5) is set to 3, N within the range RD ($a_1$ is equal to or larger than 3.5 and less than 6) is set to 4, and N within the range RE ($a_1$ is equal to or larger than 6) is set to 5.

As a result of performing the unsharpness processing, the uneven density indices $M_c$ with respect to one or more density amplification degrees $a_1$ respectively are reduced as indicated by the white squares in FIG. 7A. As the density amplification degree $a_1$ becomes larger, the number N of adjacent pixels located before and after the target pixel used for the averaging processing is set larger, and hence, as shown in FIG. 7A, the uneven density index $M_c$ is significantly reduced. In FIG. 7A, the dotted line connects the uneven density indices $M_c$ with respect to the respective density amplification degrees $a_1$ obtained after the unsharpness processing is performed.

By increasing the degree used for performing the unsharpness processing (increasing the number N of adjacent pixels), the uneven density index $M_c$ can be suppressed to a low level. However, the unsharpness processing is processing for blurring the image, and hence it is also necessary to consider to which extent the image is blurred in the unsharpness processing.

Table 1 shows results of performing visual sensory evaluations on the image data when the unsharpness processing is performed with N=5, 6, 7 and 8 on the image data at the density amplification degree $a_1$=90/10=9.

TABLE 1

| N | 5 | 6 | 7 | 8 |
|---|---|---|---|---|
| Picture image | Sharp | Slightly sharp | Slightly unsharp | Unsharp |
| Text | Slightly sharp | Slightly unsharp | Unsharp | Unsharp |

In the case of the set value N=5 within the range RE including $a_1$=9 in the first embodiment, the picture image exhibits no uncomfortableness due to blurring and is sharp. In the same case, text can be recognized with the impression that a periphery of the text is blurred, and is therefore determined to be slightly sharp. In the case of N=6, the picture image is determined to be slightly sharp because there is no problem except the impression that hue or tone are slightly mixed with those of a periphery thereof. In the same case, the text is decipherable but very hard to read due to the blurring, and is therefore determined to be slightly unsharp. In the case of N=7, the picture image is determined to be slightly unsharp because it is hard to distinguish a person from another in a group picture of people, while an overall impression of the blurring is weak. In the same case, the text is blurred, indecipherable, and is therefore determined to be unsharp. In the case of N=8, the picture image exhibits an overall feel of blurring, and is therefore determined to be unsharp. In the same case, the text is determined to be unsharp in the same manner.

From the above-mentioned results, the degree, in other words, N used for performing the unsharpness processing within the range RE has a limit of 6, and it is considered that 7 or more is not preferred.

In this manner, in the embodiment, the degree used for the unsharpness processing is adjusted based on the density reduction information read from the code in Step S14 or the density amplification degree $a_1$ obtained from the image density input-output curve used in Step S14.

As illustrated in FIG. 5, after the unsharpness processing is performed on the output image data, the displaying portion 12 displays a message that prompts the user to set the original Q2 scanned by the scanner portion 2 on the sheet feeding portion (S16). The sheet feeding portion includes the manual sheet feeding portion 14 and the sheet feeding cassette 15, any one of which may be used, and in the embodiment, the manual sheet feeding portion 14 is used. In order for the user not to mistake a direction of the original Q2 to be set on the manual sheet feeding portion 14, the displaying portion 12 displays an image indicating the direction for the setting.

Subsequently, the CPU 1 determines whether or not it has been detected that the original Q2 has been set on the manual sheet feeding portion 14 (S17). The manual sheet feeding portion 14 includes a sensor configured to sense presence/absence of a sheet of paper, and an output from the sensor allows the CPU 1 to determine whether or not the recording medium has been set. When it is determined that the original Q2 has not been set on the manual sheet feeding portion 14 (NO in S17), the process returns to Step S16.

When it is determined that the original Q2 has been set on the manual sheet feeding portion 14 (YES in S17), the displaying portion 12 displays a message that prompts the user to press a reconstruction start key on the operation portion 11, and the CPU 1 determines whether or not the reconstruction start key has been pressed (S18). When it is not determined that the reconstruction start key has not been pressed (NO in S18), the process returns to Step S18.

Figure 4D:
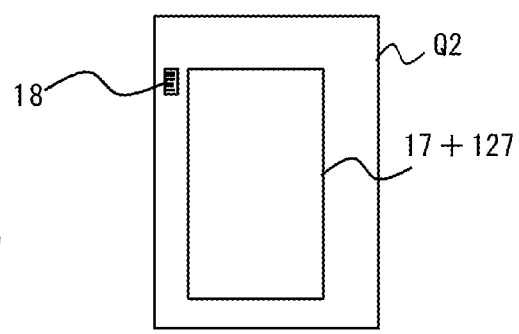

When it is determined that the reconstruction start key has been pressed (YES in S18), the set original Q2 is fed from the manual sheet feeding portion 14. The CPU 1 causes the printer portion 13 to form and superimpose an image 127 on the image 17 of the original Q2 based on the image data subjected to the unsharpness processing in Step S15 (S19, FIG. 4D). FIG. 4D illustrates the original Q2 on which the image is formed in the density reconstruction mode according to the first embodiment.

With this processing, the density of the image on the original Q2 can be reconstructed to the same density as the density of the image on the original Q1 read in the low toner consumption mode. Further, as indicated by the dotted line of FIG. 7A, the generated image data also has the uneven density index $M_c$ suppressed by the unsharpness processing. Therefore, it is possible to obtain the image having a suppressed uneven density compared to the image obtained when the unsharpness processing is not performed.

Next, a second embodiment will be described. In the first embodiment, the recording medium P1 subjected to the image formation in the low toner consumption mode is used as the original Q2 in the density reconstruction mode, and the image data generated in the density reconstruction mode is output so as to be superimposed on the image of the original Q2. In the second embodiment, the image data generated in the density reconstruction mode is output onto a new recording medium P3 instead of being superimposed on the original Q2.

Figure 8:
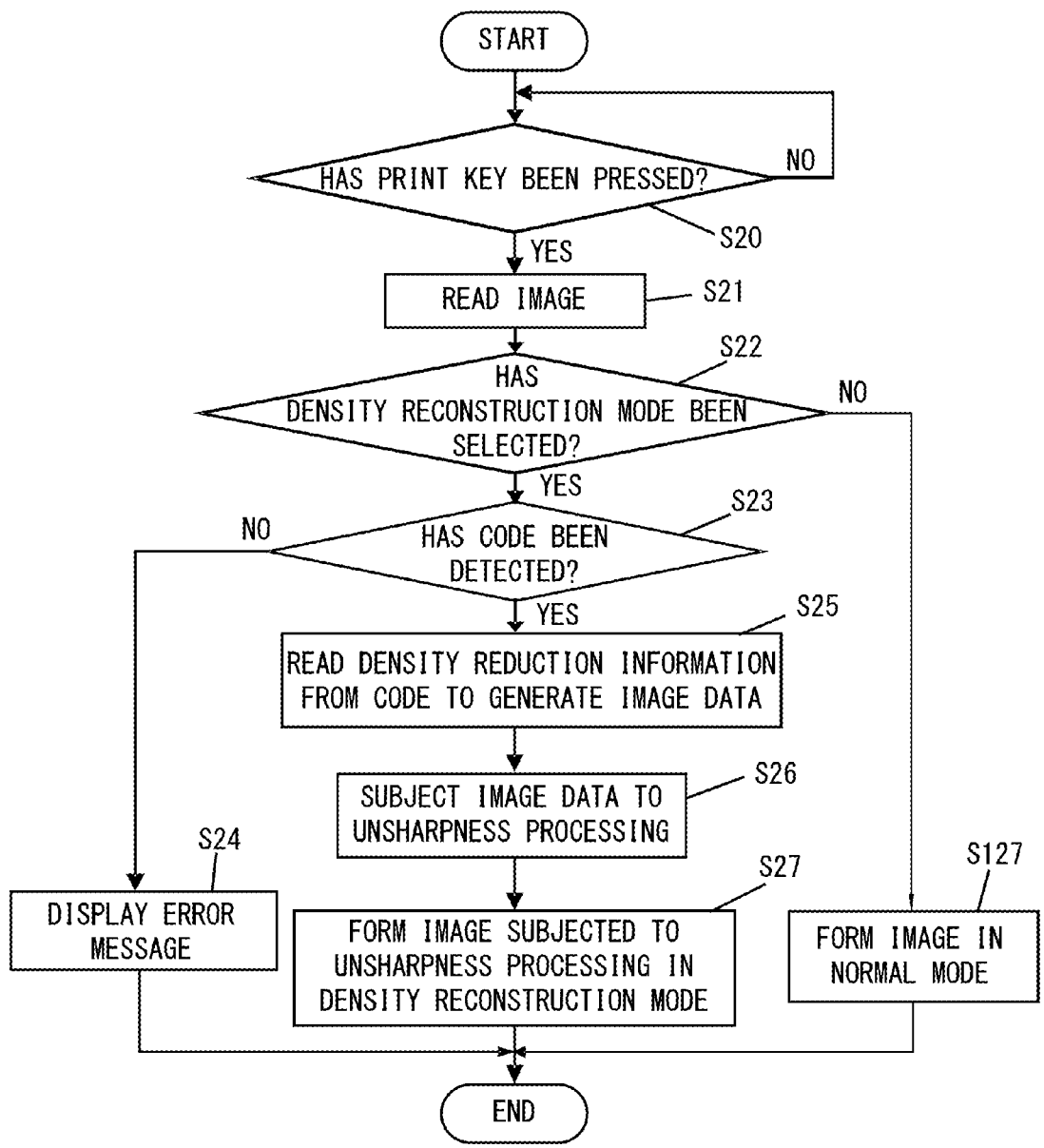
FIG. 8 is a flowchart illustrating the image forming processing performed in the density reconstruction mode by the image forming apparatus according to a second embodiment.

FIG. 8 is a flowchart illustrating the image forming processing performed in the density reconstruction mode by the image forming apparatus 100 according to the second embodiment. Note that, the image forming apparatus 100 according to the second embodiment is the same as the image forming apparatus 100 according to the first embodiment. A program for performing the image forming processing in the density reconstruction mode is stored in the ROM (storage medium) 10. The CPU 1 reads the program stored in the ROM 10 to execute the image forming processing in the density reconstruction mode according to the program.

First, the CPU 1 determines whether or not a print key on the operation portion 11 has been pressed by the user (S20). When it is determined that the print key has been pressed (YES in S20), the scanner portion 2 scans an original Q2 to read an image (S21). Note that, in this case, in the same manner as in the first embodiment, the recording medium (S118 of FIG. 2) on which the image is formed in the low toner consumption mode or the recording medium P1 having formed thereon the image 17 on which the bar code image 18 is superimposed in the low toner consumption mode (S8 of FIG. 2) is used as the original Q2. When it is determined that the print key has not been pressed (NO in S20), the process returns to Step S20.

After the image is read, the CPU 1 determines whether or not the density reconstruction mode has been selected by the user through the operation portion 11 (S22). When the density reconstruction mode is not selected, in other words, when a normal mode is selected (NO in S22), the printer portion 13 performs image formation on a recording medium P2 (FIG. 4C) in the normal mode (S127). The above-mentioned case means that a part of the read image having a density of 40% is subjected to the image formation at the density of 40%, in other words, an image density input-output curve CC of FIG. 3B is obtained. In this case, examples of the recording medium P2 include paper, an OHP sheet, cloth, and other such recording medium newly fed from the manual sheet feeding portion 14 or the sheet feeding cassette 15.

When the density reconstruction mode is selected (YES in S22), the CPU 1 determines whether or not the code detecting portion 6 has detected, in the image read from the original Q2, the bar code image 18 indicating the image density reduction information (S23). When the bar code image 18 is not detected (NO in S23), the displaying portion 12 displays an error message such as "The density reconstruction mode is disabled for the image without a bar code." (S24), and the processing is brought to an end.

When the bar code image 18 is detected (YES in S23), the reconstruction processing portion 7 reads the image density reduction information from the bar code image 18. Then, an image density input-output curve CE shown in FIG. 3B is used to generate image data being first image data according to the embodiment (S25). In other words, for the part of the read image of the original Q2 having the density of 40%, the density being the second density according to the embodiment is 100% in the generated image data.

Subsequently, the filter portion 8 subjects the generated image data to the unsharpness processing by using an intensity corresponding to the density amplification degree corresponding to the image density reduction information (S26).

FIG. 7B shows the uneven density index $M_c$ with respect to a density amplification degree $a_2$ of the image data generated in the second embodiment. In this case, assuming that the density of the image formed in the low toner consumption mode is $d_2$, the density amplification degree $a_2$ is defined by a ratio of the density 100% thereto, in other words, $100/d_2$. In other words, for example, $a_2=100/40$ means that the part of the image read in the low toner consumption mode which has the density 100% is subjected to the image formation at the density 40% and the image data is generated in the density reconstruction mode so that the density of the part is 100%.

In the second embodiment, the density of the image formed on the recording medium P1 in the low toner consumption mode, which is equal to or smaller than 100%, becomes 100% in the density reconstruction mode, and hence the density amplification degree $a_2$ always becomes equal to or larger than 1, in other words, the density is always amplified. Accordingly, the image deteriorates more significantly than in the first embodiment.

In FIG. 7B, the solid line indicates the uneven density indices $M_c$ (black diamonds) with respect to the representative density amplification degrees $a_2$ (100/90, 100/80, 100/70, . . . , 100/30, 100/20, and 100/10) in the case where the unsharpness processing is not performed. In FIG. 7B, the solid line corresponds to a relationship of the uneven density index $M_c$ with respect to the density ratio $a_0$ ($M_c=M_0 \times a_0$) as shown in FIG. 12.

The degrees to which the unsharpness processing is performed with the respective density amplification degrees $a_2$ are segmented by the ranges RA to RE in the same manner as in the first embodiment. In other words, assuming that the number of adjacent pixels used when the averaging processing is performed on the density levels of the target pixel and the adjacent pixels located before and after the target pixel is N, N within the range RA ($a_2$ is equal to or larger than 0 and less than 1) is set to 0. In the same manner, N within the range RB ($a_2$ is equal to or larger than 1 and less than 2) is set to 2, N within the range RC ($a_2$ is equal to or larger than 2 and less than 3.5) is set to 3, N within the range RD ($a_2$ is equal to or larger than 3.5 and less than 6) is set to 4, and N within the range RE ($a_2$ is equal to or larger than 6) is set to 5. Note that, in the second embodiment, as described above, the density amplification degree $a_2$ always becomes equal to or larger than 1, and hence the unsharpness processing is always performed.

As a result of performing the unsharpness processing, the uneven density indices $M_c$ are respectively reduced as indicated by the white squares in FIG. 7B. As the density amplification degree $a_2$ becomes larger, the number N of adjacent pixels located before and after the target pixel used for the averaging processing becomes larger, and hence, as shown in FIG. 7B, the uneven density index $M_c$ is significantly reduced. In FIG. 7B, the dotted line connects the uneven density indices $M_c$ with respect to the respective density amplification degrees $a_2$ obtained after the unsharpness processing is performed.

Figure 4E:
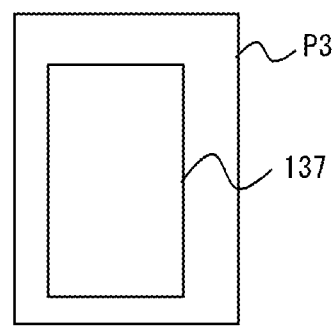

As illustrated in FIG. 8, after the unsharpness processing is performed on the generated image data, the recording medium P3 is fed. Note that, the sheet feeding portion includes the manual sheet feeding portion 14 and the sheet feeding cassette 15, any one of which may be used. Based on the image data subjected to the unsharpness processing in Step S26, the CPU 1 causes the printer portion 13 to form an image 137 on the recording medium P3 being a second recording medium according to the embodiment (S27). FIG. 4E illustrates the recording medium P3 on which the image is formed in the density reconstruction mode according to the second embodiment.

With this processing, the image 137 reconstructed to the same density as the density of the image on the original Q1 read in the low toner consumption mode can be formed on the recording medium P3 from the image formed on the recording medium P1 or the original Q2 in the low toner consumption mode. Further, as indicated by the dotted line of FIG. 7B, the generated image data also has the uneven density index $M_c$ suppressed by the unsharpness processing. Therefore, it is possible to obtain the image having a suppressed uneven density compared to the image obtained when the unsharpness processing is not performed.

In the above-mentioned first and second embodiments, a type of an original to be used is not referred to, but in the case where the original is paper, an uneven density index is affected by an uneven texture due to the type of paper.

Figure 9:
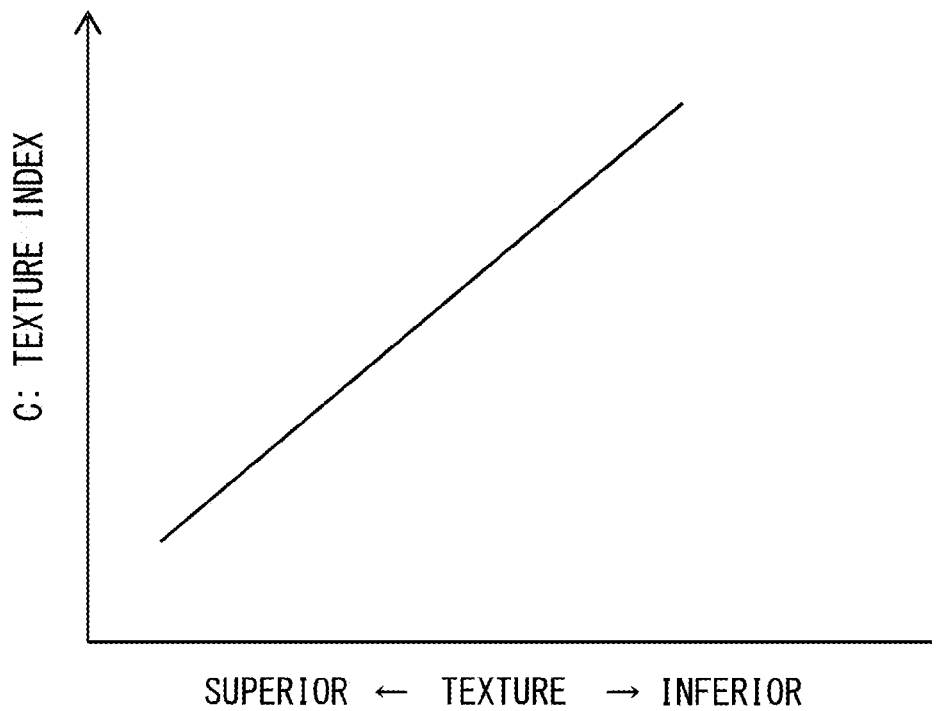
FIG. 9 is a graph showing a relationship of a texture index with respect to a degree of a texture.

FIG. 9 shows a relationship of a texture index C with respect to the degree of a texture. As understood from FIG. 9, as the texture becomes inferior, the texture index C becomes larger.

In this case, the texture index C is defined by scanning white paper with a scanner to which a transparent original reading device is mounted and obtaining a standard deviation of the square of a transmission density with respect to a basis weight. In other words, assuming that Dt represents the transmission density and B represents the basis weight (g/m$^2$), the expression C=(standard deviation of Dt$^2$)/B is obtained.

Figure 10:
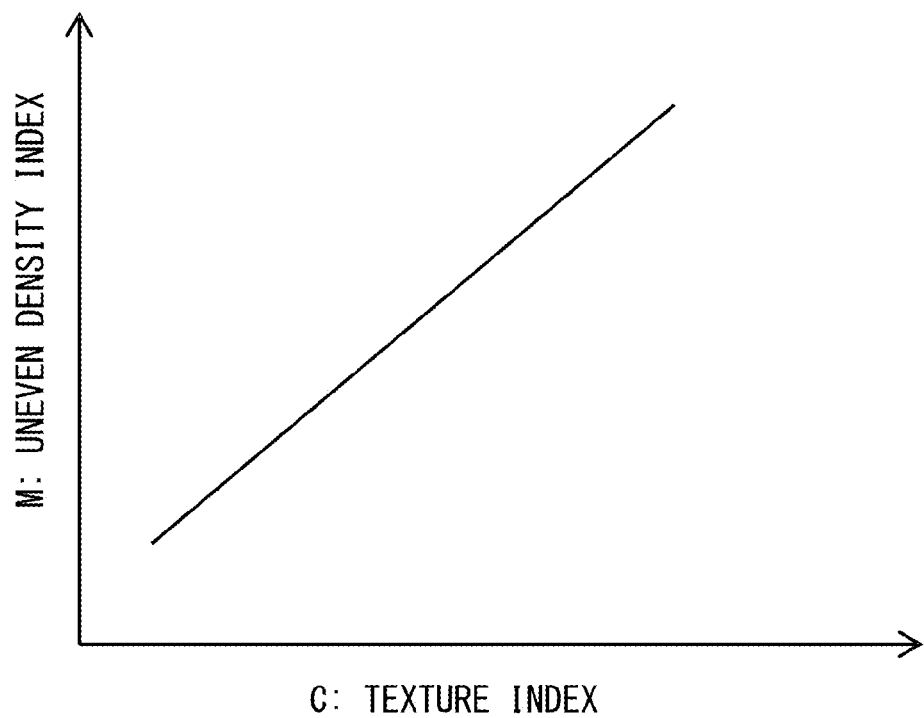
FIG. 10 is a graph showing a relationship between the texture index and the uneven density index.

FIG. 10 shows a relationship between the texture index C and an uneven density index M. As shown in FIG. 10, the uneven density index M increases as the texture index C increases. This means that, when the original is fine paper, in other words, when the original has a small texture index C, the solid lines of FIGS. 7A and 7B exhibit a small slope, while when the original is coarse paper, in other words, when the original has a large texture index C, the solid lines of FIGS. 7A and 7B exhibit a steep slope.

In FIGS. 7A and 7B, when the slope of the solid line becomes small due to the original being fine paper, the degree used for performing the unsharpness processing may be set small. For example, in FIG. 7A, in the case where the density amplification degree $a_1$ is 80/20=4 (range RD), N is set to 4, but N may be decreased to 3.

In contrast, in FIGS. 7A and 7B, when the slope of the solid line becomes steep due to the original being coarse paper, the degree used for performing the unsharpness processing needs to be set large. For example, in FIG. 7A, in the case where the density amplification degree $a_1$ is 80/20=4 (range RD), N is set to 4, but it is preferred that N be increased to 5.

The type of paper of the original may be designated by the user through the operation portion 11. Alternatively, the paper of the original may be actually scanned by the scanner portion 2 to which a transparent original reading device is mounted, and the degree used for performing the unsharpness processing may be adjusted based on obtained information on the texture index C.

In the first and second embodiments, the adjustment relating to the density, the adjustment relating to the degree used for performing the unsharpness processing, and other such adjustment are performed by the CPU 1 based on contents set in advance. However, optimal values of the density and the degree used for performing the unsharpness processing may be displayed for the user on the displaying portion 12, and the user may set the density and the degree to arbitrary values based on the optimal values displayed on the displaying portion 12. In this case, the user can perform the adjustment as desired, for example, can set the density to a slightly higher value than the optimal value of the density.

When the unsharpness processing is performed, the deterioration is alleviated in a picture or a halftone image, while the text blurs. Accordingly, when the image of the original is read by the scanner portion 2, a text area and a picture area may be recognized and segmented, and the unsharpness processing may be inhibited from being performed in the text area. In other words, the unsharpness processing may be executed only in an area (for example, picture area) other than the text area.

Figure 11:
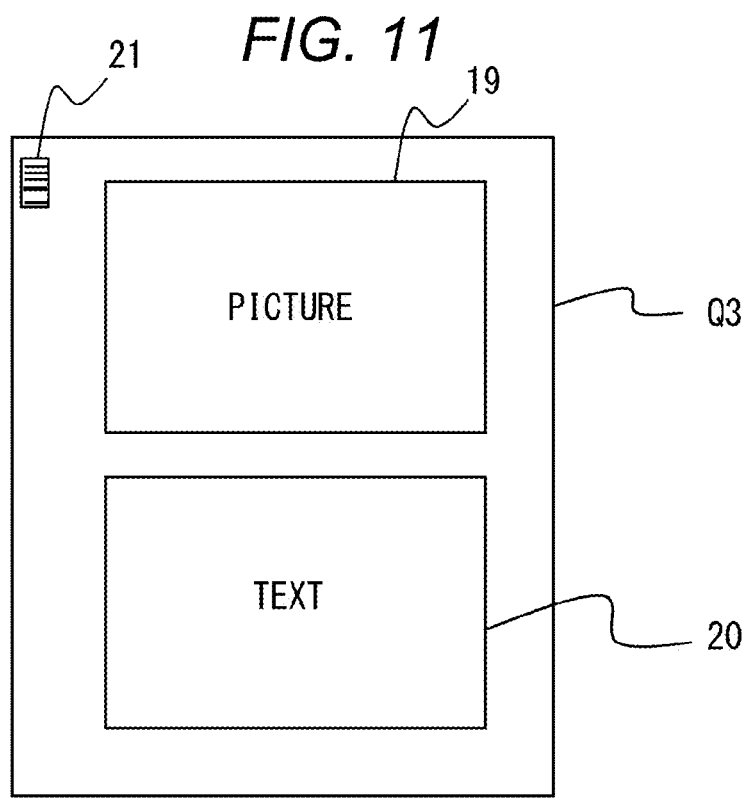
FIG. 11 is a diagram illustrating an example of the original read in the density reconstruction mode.

FIG. 11 illustrates an example of an original Q3 read in the density reconstruction mode. The original Q3 includes a picture area 19 formed of a picture (photograph), a text area 20 formed of text (characters), and a bar code image 21 indicating the image density reduction information. In this case, the unsharpness processing is performed only on the picture area 19 based on the image density reduction information included in the bar code image 21, and is inhibited from being performed on the text area 20 irrespective of the image density reduction information included in the bar code image 21. By thus inhibiting the unsharpness processing from being performed in the text area 20, it is possible to prevent the text from blurring. Note that, the picture area 19 may be formed of, for example, illustrations other than the text.

In the first and second embodiments, the original is one sheet, but the present invention is not limited thereto. The invention applies to a plurality of originals. When an automatic document feeder is set on the scanner portion 2, a plurality of originals can be read. Further, when the plurality of originals that have been read are set in the manual sheet feeding portion 14, the reconstruction of the density can be collectively performed for the plurality of originals.

The above-mentioned embodiments are described by using an image forming apparatus employing a toner system, but can be applied to an apparatus configured to form a color image or a monochrome image which employ various types such as an ink-jet type. Further, the image forming apparatus does not need to be a multifunction peripheral in which the scanner portion and the printer portion are integrated, and may have a configuration in which a scanner device and a printer device are separately provided and are connected to each other in a wired or wireless manner.

According to the above-mentioned embodiments, with one image formation processing, the image having the same high density as the density of the image on the original read in the low toner consumption mode, as well as having a suppressed uneven density, can be formed from the low-density image formed in the low toner consumption mode.

Other Embodiments

Further, the present invention is also implemented by executing the following processing. Specifically, in this processing, software (program) for implementing the functions of the above-mentioned embodiments is supplied to a system or an apparatus via a network or various kinds of storage medium, and a computer (or CPU, MPU, etc.) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-187544, filed Aug. 30, 2011, which is hereby incorporated by reference herein in its entirety.

What is claimed is:

1. An image forming apparatus, comprising:
    a reading portion configured to read an original to generate original image data;
    a code detecting portion configured to detect a code indicating image density reduction information from the original image data;
    a reconstruction processing portion configured to generate output image data from the original image data by using density input-output characteristics corresponding to the image density reduction information;
    a filter portion configured to perform unsharpness processing on the output image data by using a degree corresponding to the image density reduction information; and
    an image forming portion configured to form an image based on the output image data subjected to the unsharpness processing.

2. An image forming apparatus according to claim 1, further comprising:
    a sheet feeding portion configured to feed the original to the image forming portion,
    wherein the image forming portion forms the image based on the output image data subjected to the unsharpness processing, on the original fed from the sheet feeding portion.

3. An image forming apparatus according to claim 1, further comprising:
    a sheet feeding portion configured to feed a recording medium to the image forming portion,
    wherein the image forming portion forms the image based on the output image data subjected to the unsharpness processing, on the recording medium fed from the sheet feeding portion.

4. An image forming apparatus according to claim 1, wherein the filter portion performs the unsharpness processing on the output image data by using a degree corresponding to a texture of the original.

5. An image forming apparatus according to claim 1, wherein the original includes a text area and another area other than the text area, and
    the filter portion performs the unsharpness processing only on the another area.

6. An image forming apparatus according to claim 1, wherein the unsharpness processing comprises a processing of performing averaging on density levels of a target pixel and a predetermined number of pixels adjacent to the target pixel.

7. An image forming apparatus according to claim 6, wherein the filter portion changes the predetermined number of pixels adjacent to the target pixel by using the degree corresponding to the image density reduction information.

8. An image forming apparatus according to claim 6, wherein the original comprises a sheet of paper, and
    the filter portion changes the predetermined number of pixels adjacent to the target pixel by using a magnitude of a texture index of the paper.

9. An image forming apparatus according to claim 6, further comprising:
    a displaying portion configured to display the image density reduction information and the predetermined number of pixels adjacent to the target pixel; and
    an adjusting portion configured to adjust the image density reduction information and the predetermined number of pixels adjacent to the target pixel.

10. An image forming apparatus according to claim 1, further comprising:
    a low toner consumption mode processing portion configured to generate low toner output image data from the original image data; and
    an image composition portion configured to combine code data representing the code indicating the image density reduction information with the low toner output image data generated by the low toner consumption mode processing portion.

* * * * *